Inventor
Malcolm Roy Pike
By Cushman, Darby & Cushman
Attorneys

United States Patent Office 3,439,692
Patented Apr. 22, 1969

3,439,692
SUPERSONIC INTAKE FOR A JET ENGINE
Malcolm Roy Pike, Nottingham, England, assignor to Rolls-Royce Limited, Derby, Derbyshire, England, a British company
Filed Oct. 3, 1966, Ser. No. 583,690
Claims priority, application Great Britain, Oct. 11, 1965, 43,124/65
Int. Cl. F02b 27/00; F02k 11/04
U.S. Cl. 137—15.2    4 Claims

ABSTRACT OF THE DISCLOSURE

A wedge-shaped supersonic air intake for a jet engine which is defined by a cowl with a lip, a compression wedge and two opposite side walls, each of the side walls being movable in its own plane between a first position in which they extend to the lip of the intake and in which spillage over the side walls is prevented, and a number of other positions in which the side walls do not extend to the lip so as to allow spillage to occur.

---

This invention concerns a supersonic intake for a jet engine.

When the flight speed of a supersonic aircraft is reduced below the maximum for which it is designed, the air passing through the intake of each of its jet engines exceeds the engine demand. If the intake has internal as well as external shock compression, it is necessary to prevent the intake from "un-starting" and this has usually been done by passing the excess air away either via a spill vent located downstream of the lip of the intake or through an ejector nozzle. On the other hand, if the intake has only external shock compression, an alternative has been to spill the excess flow through a normal shock, provided the sub-critical stable range of the intake is adequate to permit this to be done.

According however to the present invention, there is provided a supersonic air intake for a jet engine, including a cowl provided with a lip, a compression wedge member extending forwardly of said lip, and two opposite side walls to define with said lip and with said wedge member a substantially wedge-shaped air inlet, at least one of said side walls having at least a part which is movable in its own plane between a first position in which it extends to the lip of the intake and in which spillage over it is prevented and at least one second position in which it fails to extend to the lip of the intake and in which spillage over it may occur.

Such an intake has the advantage that, at supersonic speeds, below the maximum design speed, it provides a lower drag method of disposing of the excess air than by the known methods referred to above.

The compression wedge member may be a fixed first compression wedge which is adapted to produce a first oblique shock, there being a variable second compression wedge which extends from the rear edge of the first compression wedge and which is adapted to produce a second oblique shock.

The side walls may be movable to a position in which they extend only to the second compression wedge.

Control means, responsive to the speed of flight, may be provided to vary the position of the second compression wedge and of the side walls so as to control the throat area and the amount of spillage in accordance with said speed.

The invention also comprises a supersonic jet engine provided with an intake as set forth above.

Additionally, the invention comprises a supersonic aircraft provided with such a jet engine.

Figure 1:
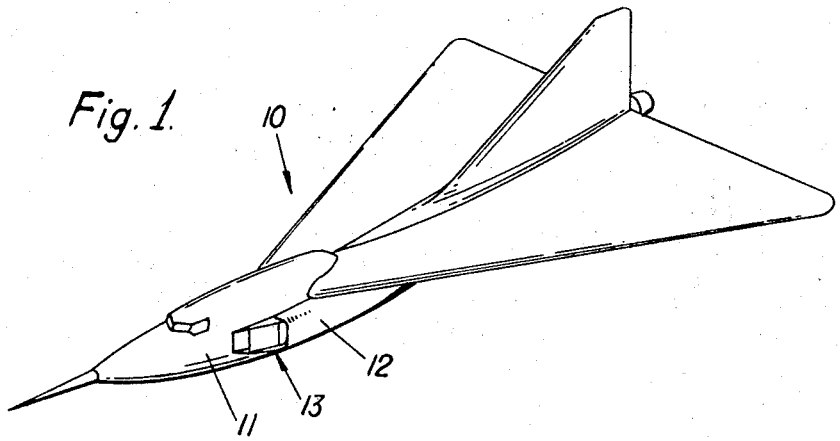
Figure 2:
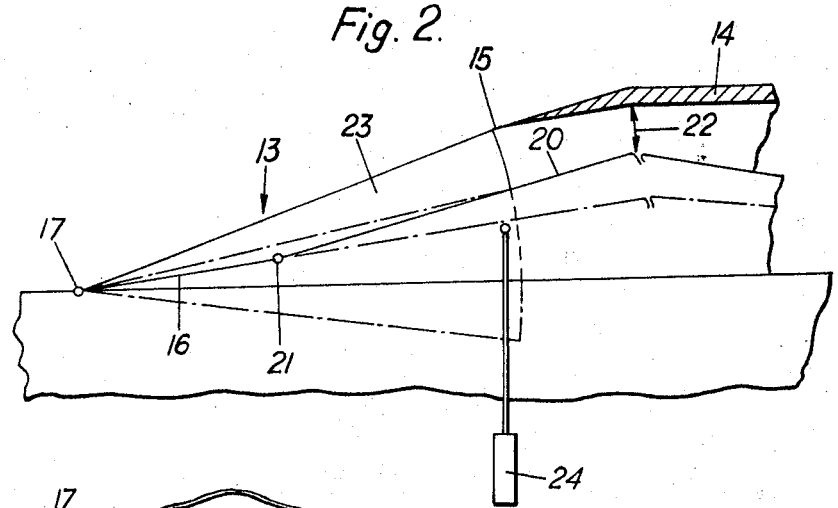
Figure 3:
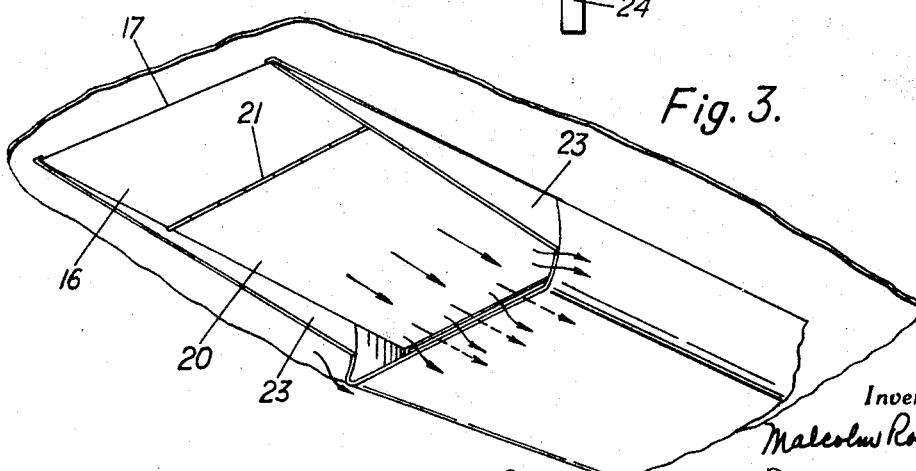

The invention is illustrated, merely by way of example, in the accompanying drawings, in which:

FIGURE 1 is a perspective view of a supersonic aircraft provided with jet engines having intakes in accordance with the present invention, FIGURE 2 is a broken-away diagrammatic sectional view of one such intake, and FIGURE 3 is a broken-away perspective view of such an intake.

In FIGURE 1 there is shown a supersonic aircraft 10 having a fuselage 11 on each of whose diametrically opposite sides there is mounted a gas turbine jet engine 12 having the usual compressors, combustion equipment, and turbines (not shown).

Each of the engines 12 has a supersonic wedge-shaped air intake having a cowl 14 provided with a lip 15 and a compression wedge member 13.

Each of the compression wedge members 13 has a fixed first compression wedge 16 the upstream end of which defines a leading edge 17 and which extends forwardly of the lip 15 and downstream from the leading edge 17 of the air intake and which is adapted to produce a first oblique shock which extends from the leading edge 17 to the lip 15.

Each of the compression wedge members 13, moreover, has a variable second compression wedge 20 which extends downstream from the rear edge of the first compression wedge 16 and which is pivotally connected thereto at a hinge 21. Each said second compression wedge 20 is adapted to produce a second oblique shock which extends from the hinge 21 to the lip 15.

The second compression wedge 20 is movable (by means not shown) between the full line position shown in FIGURE 2, in which it provides the intake with a throat 22 of minimum area, and a chain dotted position (also shown in FIGURE 2) in which it provides the air intake with a throat of maximum area.

Each of the compression wedge members 13 has sector-shaped side walls 23 each of which is movable in its own plane by an actuator 24 between the full line and dotted line positions shown in FIGURE 2. In the full line position, the side walls 23 extend to the lip 15 and in this position there will be no spillage of excess air over the side walls 23. In the dotted line position, however, the side walls 23 extend only to the second compression wedge 20 and do not extend to the lip 15 with the result that spillage of excess air may occur over the side walls 23.

The side walls 23 may, moreover, be placed in a number of intermediate positions between the full line and dotted line positions, whereby to vary the extent of the spillage of excess air.

At the designed supersonic speed of the aircraft, the side walls 23 are placed in their full line position and the second compression wedge 20 is also placed in its full line position.

As, however, the speed of the aircraft is reduced, the side walls 23 are gradually adjusted towards their dotted line positions, whereby increasing quantities of excess air are spilled over them, while at the same time the second compression wedge 20 is adjusted towards the dotted line position.

Control means (not shown), which are responsive to the speed of flight, may be provided to vary the position of the second compression wedge 20 and that of the side walls 23 so as to control the area of the throat 22 and the amount of spillage over the side walls 23 in accordance with said speed.

I claim:

1. A supersonic air intake for a jet engine comprising: a cowl provided with a lip; a compression wedge member extending forwardly of said lip; and two opposite side walls for said compression wedge member; said lip, said compression wedge member and said opposite side walls defining a substantially wedge-shaped air inlet; at least one of said side walls having at least a part which is movable in its own plane between a first position in which it extends to the lip of the intake and in which spillage over it is prevented and at least one second position in which it fails to extend to said lip of the intake and in which spillage over it may occur.

2. A supersonic air intake as claimed in claim 1 in which said compression wedge member includes a fixed first compression wedge which is adapted to produce a first oblique shock and a variable second compression wedge which extends from the rear edge of said first compression wedge and which is adapted to produce a second oblique shock.

3. A supersonic air intake as claimed in claim 2 in which the side walls are movable to a position in which they extend only to the second compression wedge.

4. A supersonic air intake as claimed in claim 2 in which control means, responsive to the speed of flight, are provided to vary the position of the second compression wedge and of the side walls so as to control the throat area and the amount of spillage in accordance with said speed.

References Cited

UNITED STATES PATENTS 2,997,843    8/1961    Arnett _____ 137—15.2
3,030,770    4/1962    Ranard _____ 137—15.1

ALAN COHAN, *Primary Examiner.*